United States Patent [19]

Kurek et al.

[11] Patent Number: 5,511,828
[45] Date of Patent: Apr. 30, 1996

[54] FLEXIBLE JOINT FOR AUTOMOBILE EXHAUST PIPE

[75] Inventors: Kenneth M. Kurek, Geneva, Ill.; Alain M. Pierre, Le Chesnay, France; Takashi Maeda, Fujisawa; Takeshi Fukukido, Yamato, both of Japan

[73] Assignees: Oiles Corporation, Tokyo, Japan; Metex Corporation, Edison, N.J.

[21] Appl. No.: 276,676

[22] Filed: Jul. 15, 1994

Related U.S. Application Data

[63] Continuation-in-part of Ser. No. 127,560, Sep. 28, 1993, abandoned.

[51] Int. Cl.[6] .............................. F16L 59/16; F16L 59/22
[52] U.S. Cl. ........................... 285/49; 285/226; 285/45; 285/300; 285/416
[58] Field of Search ............................. 285/45, 49, 226, 285/299, 300, 414, 405, 368, 416

[56] References Cited

U.S. PATENT DOCUMENTS

| | | | |
|---|---|---|---|
| 337,037 | 2/1886 | White | 285/300 |
| 1,718,209 | 6/1929 | Aldrich et al. | 285/226 |
| 2,381,432 | 8/1945 | Bratton | 285/226 |
| 2,470,989 | 5/1949 | Keller et al. . | |
| 2,631,048 | 3/1953 | Palmer | 285/299 |
| 3,369,829 | 2/1968 | Hopkins | 285/45 |
| 3,566,510 | 3/1971 | Wendt | 285/49 |
| 3,574,361 | 4/1971 | Contreras . | |
| 3,820,829 | 6/1974 | Hasselbacher et al. | 285/300 |
| 3,977,709 | 8/1976 | Hatzis | 285/368 |
| 4,058,328 | 11/1977 | Nickerson et al. | 285/45 |
| 4,350,372 | 9/1982 | Logsdon . | |
| 4,511,162 | 4/1985 | Broyles | 285/299 |
| 4,526,409 | 7/1985 | Schaefer . | |
| 4,659,091 | 4/1987 | Baasner et al. . | |
| 4,659,117 | 4/1987 | Holzhausen et al. . | |
| 4,875,716 | 10/1989 | Winzen et al. . | |
| 4,893,847 | 1/1990 | Hess . | |
| 4,928,998 | 5/1990 | Brandener . | |
| 4,958,860 | 9/1990 | Akitsu . | |
| 5,083,817 | 1/1992 | Holzhausen et al. . | |
| 5,322,670 | 6/1994 | Ibrahim et al. | 285/49 |

FOREIGN PATENT DOCUMENTS

| | | | |
|---|---|---|---|
| 432436 | 6/1991 | European Pat. Off. . | |
| 2617536 | 1/1989 | France . | |
| 2238109 | 2/1975 | Germany | 285/49 |
| 58-86986 | 6/1983 | Japan . | |
| 3523716 | 11/1991 | Japan | 285/49 |
| 5231575 | 9/1993 | Japan | 285/49 |
| 773375 | 10/1980 | U.S.S.R. | 285/226 |
| 792476 | 3/1958 | United Kingdom | 285/226 |
| 1260145 | 1/1972 | United Kingdom | 285/49 |

*Primary Examiner*—Dave W. Arola
*Assistant Examiner*—Heather Chun Shackelford
*Attorney, Agent, or Firm*—Banner & Allegretti, Ltd.

[57] ABSTRACT

A flexible joint for an automobile exhaust system includes a flexible bellows for sealing the communication between the engine and the tail pipe with first and second flanges fixed to the respective members and interconnected by coupling shafts that are fixed at one end to one of the flanges and passed loosely through the other flange whereby compression springs that surround the coupling shafts serve together with the bellows to provide support capable of accommodating relative axial and angular deflections between the members. One of the flanges is so configured and disposed with respect to the bellows as to limit the amount of angular deflection imposed on the bellows. Damping sleeves composed of compressed wire mesh material operate to dampen vibrations imposed on the joint.

48 Claims, 10 Drawing Sheets

FLEXIBLE JOINT FOR AUTOMOBILE EXHAUST PIPE

This application in-part application based on U.S. Ser. No. 08/127,560, filed Sep. 28, 1993, now abandoned.

BACKGROUND OF THE INVENTION

The present invention relates to a flexible joint for connecting elements for conducting exhaust gases from an automobile engine to the outside such that an angle of connection between the elements is changeable and the exhaust pipes are capable of freely moving relatively toward or away from each other.

As a joint of this type, one disclosed in, for instance, Japanese Utility Model Unexamined Publication No. 86986/1983 is known. The joint disclosed in this publication comprises a bellows tube for preventing the leakage of exhaust gases and connecting together respective exhaust pipes of an engine-side exhaust system and a tail pipe-side exhaust system in such a manner that an angle of connection is changeable and the exhaust pipes are capable of freely moving relatively toward or away from each other, as well as a coil spring for resiliently connecting the exhaust pipes by resiliently restricting the expansion of the bellows tube more than is necessary.

The joint of this type is required to absorb the vibrations of the exhaust pipe of the engine-side exhaust system and prevent transmission of the vibrations to the exhaust pipe of the tail pipe-side exhaust system. With the joint disclosed in the aforementioned publication, however, since the two exhaust pipes are connected resiliently via the coil spring, vibrations based on the phenomenon of mechanical resonance are liable to occur. As a result of this phenomenon of mechanical resonance, there is a possibility that the vibrations are transmitted to the exhaust pipe of the tail pipe-side exhaust system without being dampened, thereby producing unpleasant noise in and outside the automobile and deteriorating the riding comfort of occupants in the automobile.

In addition, with the above-described joint, when the vibration, particularly swinging vibration, of the exhaust pipe of the engine-side exhaust system occurs, the bellows tube is swung with its fixed portion to the exhaust pipe of the tail pipe-side exhaust system as a fulcrum. As a result, large repeated bending occurs to one fixed portion of the bellows tube as compared with the other fixed portion. Mechanical fatigue due to this repeated bending sometimes causes damage to one fixed portion of the bellows tube at an early period.

Meanwhile, although the temperature of the exhaust gases from the engine is about 1100° C., if the exhaust gases of this temperature are brought into direct contact with the bellows tube, the corrosion and deterioration of the bellows tube are promoted. Accordingly, particularly in the case where the joint is formed by using a thin-walled bellows tube as described above, a countermeasure against the exhaust gas temperature is required, but no countermeasure is adopted in the above-described joint.

In addition, since the joint of this type is generally provided on the underside of the chassis in such a manner as to be exposed to and oppose the traveling road surface, there are cases where a thermal shock occurs to the bellows tube as water from the traveling road surface is splashed onto it, and the bellows tube is subjected to the direct impact of stones from the traveling road surface. Hence, there is the possibility that cracks, holes or the like occur in the bellows tube, resulting in the leakage of exhaust gases.

SUMMARY OF THE INVENTION

The present invention has been accomplished in view of the above-described problems, and an object of the present invention is to provide a flexible joint for an automobile exhaust system capable of easily eliminating the phenomenon of mechanical resonance due to the vibration in the system, and of improving the riding comfort of occupants in the vehicle by eliminating uncomfortable noise.

Another object of the present invention is to provide a flexible joint for an automobile exhaust pipe capable of minimizing the occurrence of mechanical fatigue of an offset bellows tube so as to prevent the early deterioration of the bellows tube.

Still another object of the present invention is to provide a flexible joint for an automobile exhaust pipe capable of preventing the corrosion and deterioration of the bellows tube caused by high-temperature exhaust gases so as to prevent the early deterioration of the bellows tube.

A further object of the present invention is to provide a flexible joint for an automobile exhaust pipe which is not subjected to splashes of water from the traveling road surface and the direct impact of stones from the road surface.

A still further object of the present invention is to provide a flexible joint for an automobile exhaust pipe which can be installed in automotive exhaust systems by a very simple operation.

To these ends, in accordance with the present invention, there is provided a flexible joint for an automobile exhaust pipe, comprising: a first flange fixed to an exhaust pipe of an engine-side exhaust system; a second flange fixed to an exhaust pipe of a tail pipe-side exhaust system; a flexible bellows tube having one end fixed to the exhaust pipe of the engine-side exhaust system and another end fixed to the exhaust pipe of the tail pipe-side exhaust system so as to couple the two exhaust pipes to each other in such a manner that an angle of connection of the two exhaust pipes is changeable and the two exhaust pipes are capable of freely moving relatively toward or away from each other in an axial direction; a coupling shaft having one end fixed to one of the first and second flanges and an intermediate portion passing loosely through a hole formed in the other one of the first and second flanges; a spring seat attached to another end of the coupling shaft; a first coil spring disposed between the first and second flanges concentrically with the coupling shaft; a second coil spring disposed between the other one of the flanges and the spring seat concentrically with the coupling shaft; a first sleeve-like damper member disposed between the first and second flanges concentrically with the coupling shaft and formed by compressing a wire mesh sheet; and a second sleeve-like damper member disposed between the other one of the flanges and the spring seat concentrically with the coupling shaft and formed by compressing the wire mesh sheet.

In a preferred example, the hole is formed in the first flange, the one end of the coupling shaft is fixed to the second flange, and the second coil spring and the second damper member are disposed between the first flange and the spring seat. Preferably, the first flange includes a hollow cylindrical portion having one end fixed to the exhaust pipe of the engine-side exhaust system and a spring seat portion extending radially outward from another end of the hollow cylindrical portion, and the spring seat portion is disposed at a position corresponding to an axially intermediate position of the bellows tube.

The joint in accordance with the present invention may further comprise an outer pipe disposed outside and concentrically with the bellows tube and having one end fixed to the hollow cylindrical portion of the first flange and another end disposed in a vicinity of the other end of the bellows tube fixed to the exhaust pipe of the tail pipeside exhaust system.

Preferably, the joint in accordance with the present invention further comprises an inner pipe disposed inside and concentrically with the bellows tube and having one end fixed to the exhaust pipe of the engine-side exhaust system and another end disposed in a vicinity of the another end of the bellows tube fixed to the exhaust pipe of the tail pipeside exhaust system.

In a preferred example of the joint in accordance with the present invention, the first flange includes a small diameter hollow cylindrical portion secured at one end thereof to the exhaust pipe of the engine-side exhaust system, an annular portion extending radially outward from another end of the small-diameter hollow cylindrical portion, a large-diameter hollow cylindrical portion extending axially from a rim of the annular portion, a spring seat portion extending radially outward from the large-diameter hollow cylindrical portion, and a generally elliptical portion having an offset edge extending axially from a rim of the spring seat portion toward the second flange, while the second flange includes a hollow cylindrical portion secured at one end thereof to the exhaust pipe of the tail pipe-side exhaust system, an annular portion extending radially outward from another end of the hollow cylindrical portion of the second flange, a spring seat portion extending radially outward from a rim of the annular portion of the second flange, and a generally elliptical portion having an offset edge extending axially from a rim of the spring seat portion of the second flange toward the first flange, the spring seat portion of the first flange being disposed at a position corresponding to an axially intermediate position of the bellows tube.

The joint in accordance with the present invention may further comprise a joining means for joining together respective one ends of the first flange, the bellows tube, and the inner pipe. Here, the joining means may include curved portions formed in a mutually complementary manner in the respective one ends of the first flange, the bellows tube, and the inner pipe. Also, the joining means may include a folded-back portion formed at the one end of the inner pipe, and the respective one ends of the first flange and the bellows tube are fitted in an annular cavity defined by the folded-back portion. Furthermore, the joining means may include a plurality of through holes formed at the one end of the first flange, and a plurality of curved portions formed in a mutually complementary manner in the respective one ends of the bellows tube and the inner pipe.

In the joint in accordance with the present invention, since the two exhaust pipes are connected to each other by means of the bellows tube, the leakage of exhaust gases can be prevented positively. Since the bellows tube is held by the coil springs and the like, the two exhaust pipes can be connected in such a manner that deflection of the angle of their connection can be tolerated and they are capable of freely moving relatively toward or away from each other. In addition, since the first and second damper members are provided, vibrations due to the phenomenon of mechanical resonance can be dampened at an early period.

Hereafter, a more detailed description of the present invention will be given on the basis of preferred embodiment shown in the drawings. Hence, the above-described objects and features, as well as other objects and features of the invention will become more apparent. It should be noted that the present invention is not restricted to the embodiment.

DESCRIPTION OF THE PREFERRED EMBODIMENT

Figure 1:
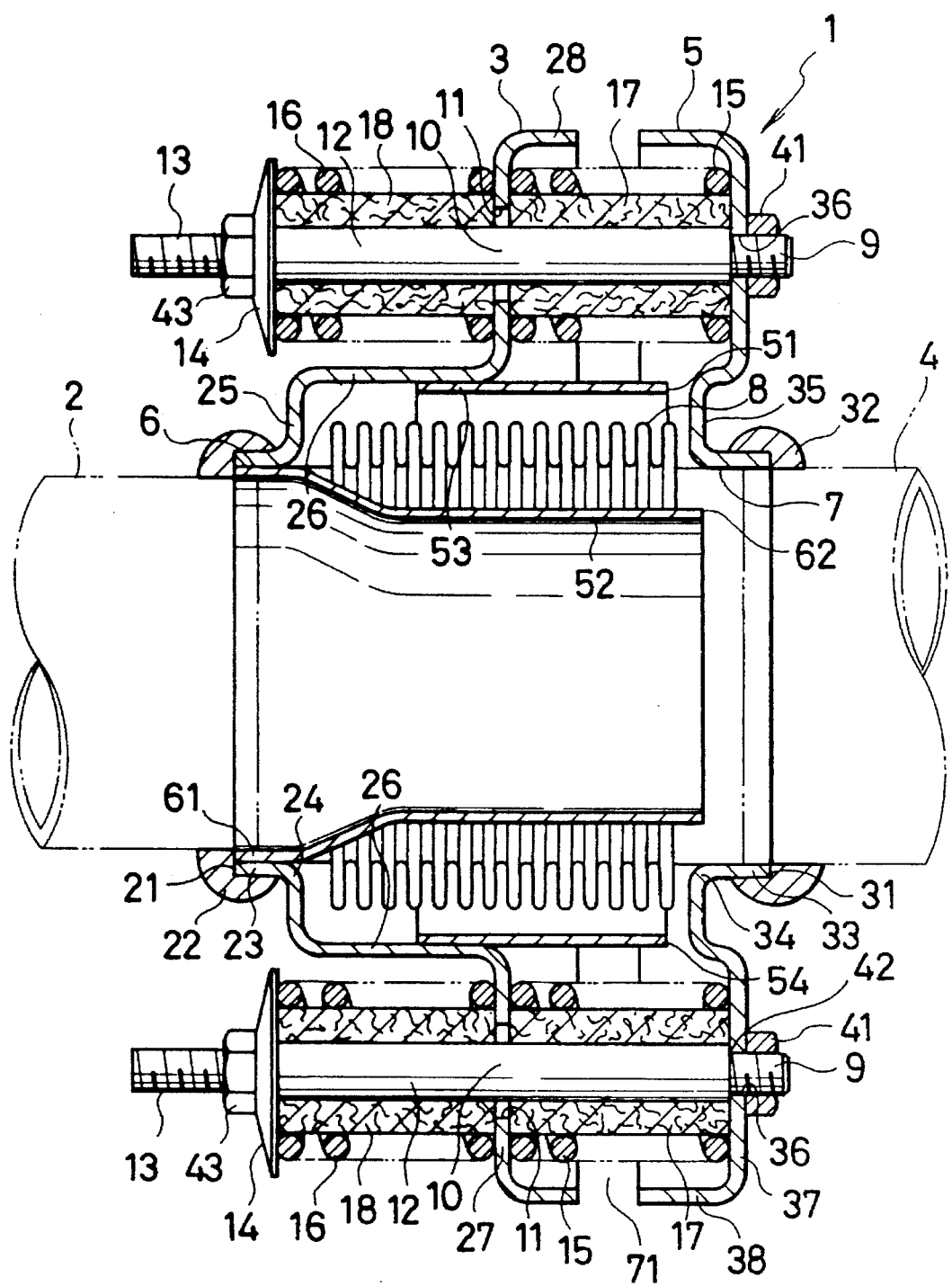
FIG. 1 is a cross-sectional view of a preferred embodiment in accordance with the present invention.
Figure 2:
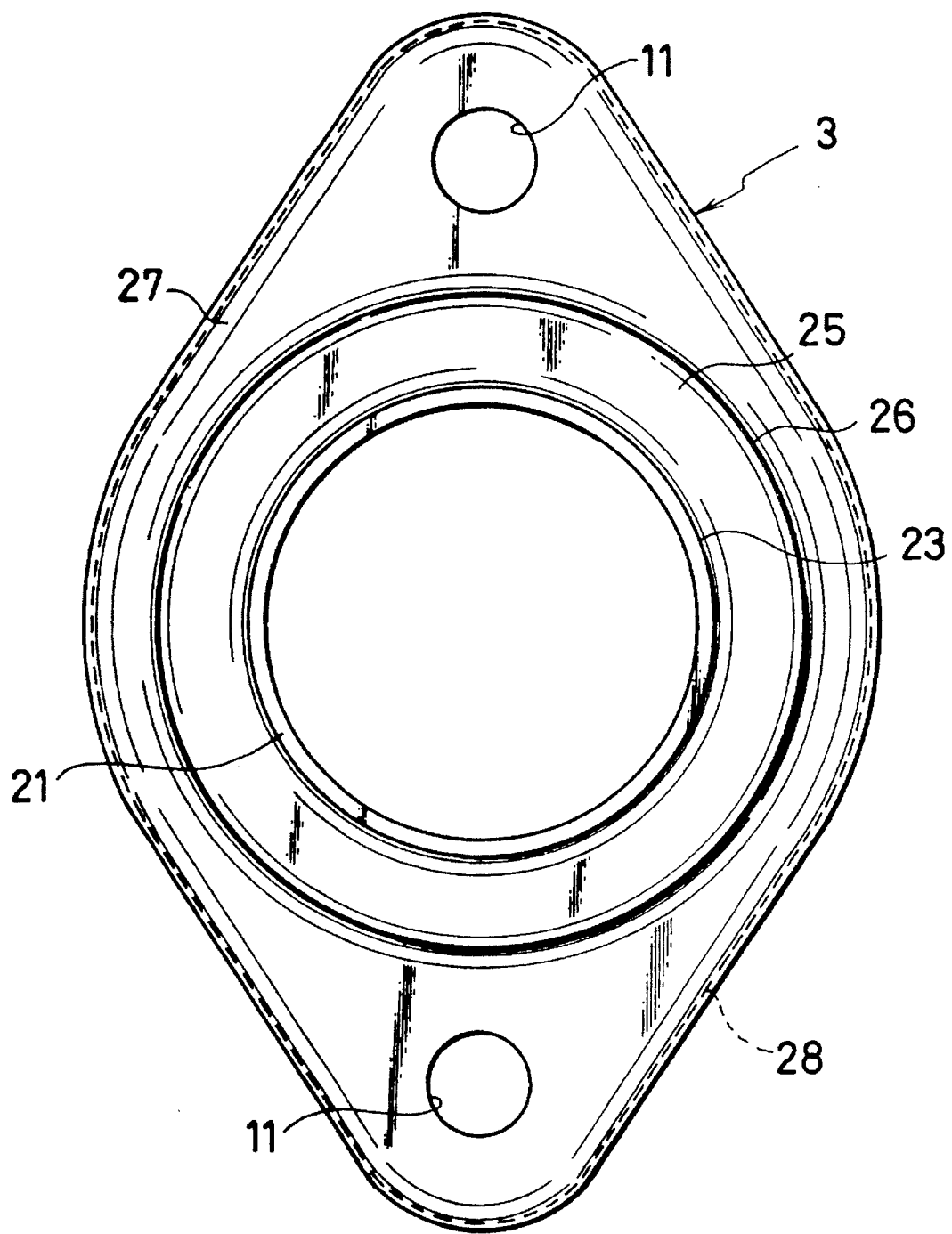
FIG. 2 is a left side elevational view of one flange in the embodiment shown in FIG. 1.
Figure 3:
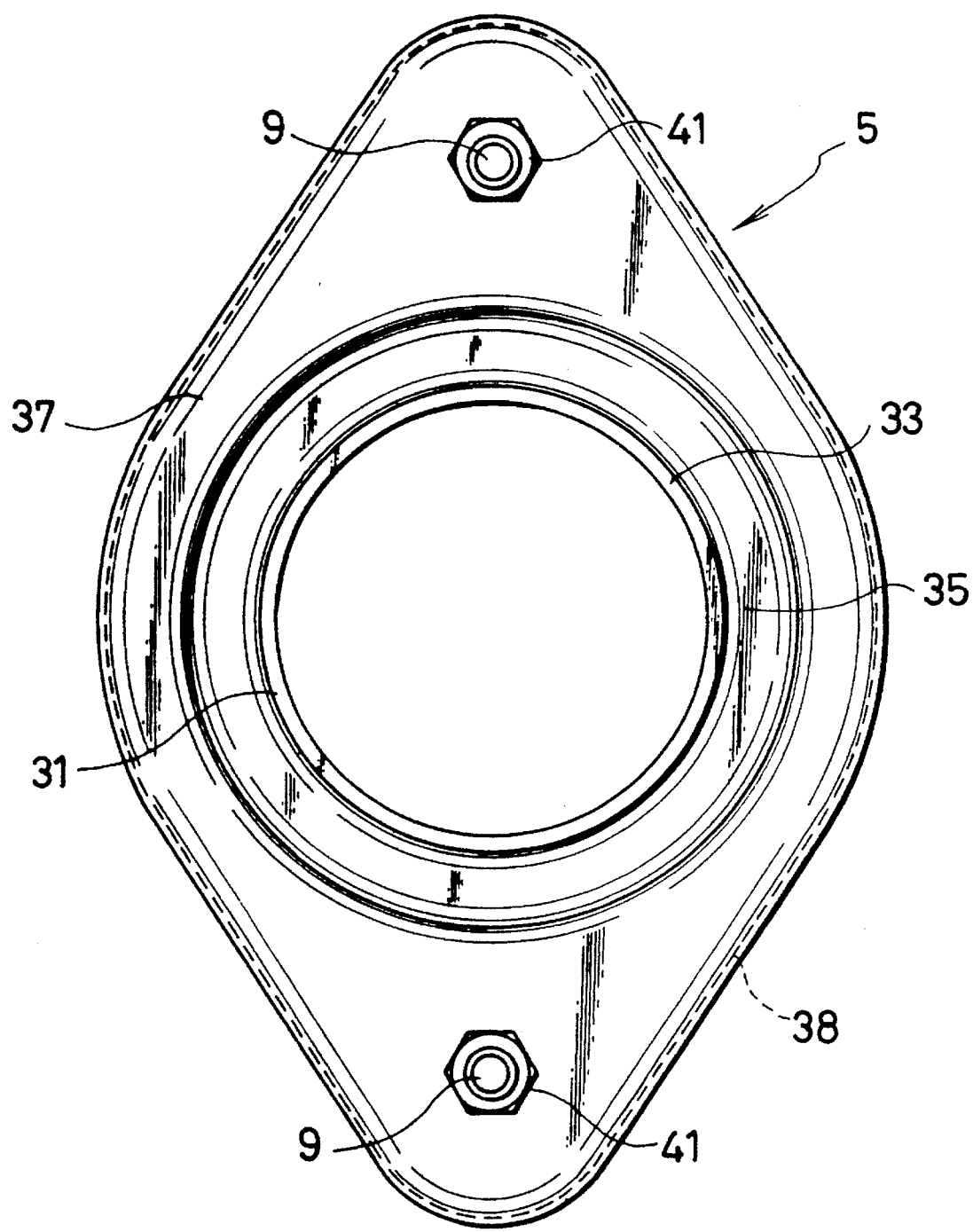
FIG. 3 is a right side elevational view of another flange in the embodiment shown in FIG. 1.

In FIGS. 1 to 3, a joint 1 in accordance with an embodiment of the present invention is comprised of a metal flange 3 fixed to an exhaust pipe 2 of an engine-side exhaust system; a metal flange 5 fixed to an exhaust pipe 4 of a tail pipe-side exhaust system; a flexible bellows tube 8 having one end 6 fixed to the exhaust pipe 2 and the other end 7 fixed to the exhaust pipe 4 so as to couple the two exhaust pipes 2 and 4 to each other in such a manner that an angle of their connection is changeable and they are capable of freely moving relatively toward or away from each other in the axial direction; a pair of coupling shafts 12 whose respective one ends 9 are fixed to the flange 5 and whose respective intermediate portions 10 are passed loosely through a pair of through holes 11 formed in the flange 3; a pair of spring seats 14 attached to respective other ends 13 of the coupling shafts 12; a pair of coil springs 15 each disposed between the flanges 3 and 5 concentrically with the coupling shaft 12; a pair of coil springs 16 each disposed between the flange 3 and the spring seat 14 concentrically with the coupling shaft 12; a pair of dampers in the form of resilient hollow cylindrical members 17 each disposed between the flanges 3 and 5 concentrically with the respective coupling shaft 12, and formed by compressing a wire mesh sheet; and a pair of dampers in the form of resilient hollow cylindrical members 18 each disposed between the flange 3 and the respective spring seat 14 concentrically with the respective coupling shaft 12, and formed by compressing the wire mesh sheet.

The metal flange 3 is comprised of a small-diameter hollow cylindrical portion 23 which is secured to the exhaust pipe 2 at an annular end 21 thereof by means of welding 22 or the like; an annular portion 25 extending radially outward from an annular other end 24 of the small diameter hollow cylindrical portion 23; a large-diameter hollow cylindrical portion 26 extending axially from a rim of the annular portion 25; a spring seat portion 27 of a generally annular elliptical shape in which the pair of through holes 11 are formed symmetrically in its long axis; and a generally elliptical offset edge portion 28 extending axially from a rim of the spring seat portion 27 toward the flange 5. The spring seat portion 27 of the flange 3 is disposed at a position corresponding to an axially intermediate position of the bellows tube 8.

The metal flange 5 is comprised of a hollow cylindrical portion 33 which is secured to the exhaust pipe 4 at an annular end 31 thereof by means of welding 32 or the like; an annular portion 35 extending radially outward from another end 34 of the hollow cylindrical portion 33; a spring seat portion 37 of a generally annular elliptical shape extending radially outward from a rim of the annular portion 35 and having a pair of through holes 36 formed symmetrically in its long axis; and a generally elliptical offset edge portion 38 extending axially from a rim of the spring seat portion 37 toward the flange 3.

The flexible bellows tube 8 is formed of a single metallic layer, and its wall thickness is 0.2 mm in this embodiment, but is not confined to the same. For instance, the wall thickness may be 0.1 mm to 0.5 mm or thereabouts, and may preferably be in the range of 0.15 mm to 0.25 mm. Although in this embodiment the flexible bellows tube 8 is formed of a single layer, the bellows tube may be formed of two or three layers.

The pair of coupling shafts 12 are respectively provided with external threads formed on both one ends 9 and 13 thereof, a nut 41 being threadedly engaged on one end 9 of each coupling shaft 12 passing through the through hole 36. The coupling shafts 12 are each secured firmly to the flange 5 with the spring seat portion 37 clamped by the nut 41 and an annular stepped portion 42 of the coupling shaft 12. Each spring seat 14 has a nut portion 43, which is threadedly engaged on the other end 13 of the coupling shaft 12, and by which the seat 14 is secured to the coupling shaft 12.

Each of the coil spring 15 is disposed between the flanges 3 and 5 by being compressed so as to urge the spring seat portions 27 and 37 away from each other, while each of the coil springs 16 is disposed between the flange 3 and the spring seat 14 by being compressed so as to urge the spring seat 14 and the spring seat portion 27 away from each other.

The dampers defined by resilient hollow cylindrical members 17 and 18 are formed such that a wire mesh sheet formed by weaving or knitting a small-diameter metal wire, such as a steel wire, is wound into a hollow cylindrical member, and then this hollow cylindrical member is compressed in the axial direction to an extent that a desired resiliency is left. The diameter of the small-diameter metal wire is in the range of 0.1 mm to 0.5 mm, preferably 0.1 mm to 0.3 mm. The degree of compression of the hollow cylindrical member of the small-diameter metal wire in which the desired resiliency is left depends on the resilient characteristic of the small-diameter wire, and compression is effected to such a degree that the density (apparent density) of the obtained resilient hollow cylindrical member becomes 0.5 g/CM3 to 5 g/CM3, preferably 1 g/cm3 to 2.5 g/cm3. Also, an arrangement may be provided such that the resilient hollow cylindrical members 17 and 18 having various resiliencies are prepared in advance, and they are selectively applied to the joint 1 to adjust the mechanical resonance characteristic of the joint 1, so that the vibrations to which the joint 1 is subjected will be dampened most or to a desirable level. Although, in the embodiment shown in FIG. 1, the resilient hollow cylindrical members 17 and 18 are disposed on the inner sides of the springs 15 and 16, the springs 15 and 16 may conversely be disposed on the inner sides of the resilient hollow cylindrical members 17 and 18.

The joint 1 in this embodiment further includes a metallic outer pipe 51 and a similarly metallic inner pipe 52. The outer pipe 51 is disposed outside and concentrically with the bellows tube 8, and its annular end 53 is secured to the large-diameter hollow cylindrical portion 26 by means of welding or the like, while its other annular end 54 is disposed in the vicinity of the end 7 of the bellows tube 8. The inner pipe 52 is disposed inside and concentrically with the bellows tube 8, and its annular end 61 is secured to the exhaust pipe 2 by means of welding or the like, while its other annular end 62 is disposed in the vicinity of the end 7 of the bellows tube 8.

The exhaust pipe 2 is connected to, for instance, an exhaust manifold or the like of an engine, while the exhaust pipe 4 is connected to a tail pipe via an exhaust gas converter, a muffler and the like.

In the above-described joint 1, when vibrations in a rolling direction due to the operation of the engine, i.e., relative angular displacements in a direction perpendicular to the plane of the drawing in FIG. 1, in other words, swinging vibrations occur between the exhaust pipes 2 and 4, these relative angular displacements occur between the flanges 3 and 5 as well and cause the coil springs 15 and 16 to expand or contract. The relative angular displacements in the rolling direction are absorbed by the expansion and contraction of the coil springs 15 and 16, so that the transmission of the angular displacements from the exhaust pipe 2 to the exhaust 4 is suppressed. The bellows tube 8 is also readily expanded or contracted by these angular displacements, and does not transmit the angular displacements from the exhaust pipe 2 to the exhaust pipe 4. Accordingly, the joint 1 is capable of sufficiently damping the relative vibrations in the rolling direction by maintaining the gastightness of the coupling section between the exhaust pipes 2 and 4. In addition, relative angular displacements in a direction perpendicular to the rolling direction also cause the coil springs 15 and 16 to expand or contract. Hence, the relative angular displacements in the direction perpendicular to the rolling direction are absorbed by that expansion and contraction, thereby suppressing the transmission of the angular displacements from the exhaust pipe 2 to the exhaust pipe 4.

Furthermore, when relative vibrations in the axial direction due to the operation of the engine, i.e., movements toward or away from each other in the axial direction, occur between the exhaust pipes 2 and 4, these relative vibrations occur between flanges 3 and 5 as well. As a result the coil springs 15 and 16 are expanded or contracted, and the relative vibrations are absorbed by the expansion and contraction of the coil springs 15 and 16. Accordingly, the transmission of vibrations in the axial direction from the exhaust pipe 2 to the exhaust pipe 4 is suppressed. The bellows tube 8 is also readily expanded or contracted by these vibrations, and does not transmit the vibrations from the exhaust pipe 2 to the exhaust pipe 4. Accordingly, the joint 1 is capable of sufficiently damping the relative vibrations in the axial direction by maintaining the gastightness of the coupling section between the exhaust pipes 2 and 4.

In addition, since the joint 1 is provided with the resilient hollow cylindrical members 17 and 18 which function as mechanical dampers, the mechanical resonance characteristic of the joint 1 can be made gentle, so that the vibrations occurring between the flanges 3 and 5 due to the phenomenon of mechanical resonance can be dampened at an early period. Furthermore, since the resilient hollow cylindrical members 17 and 18 are disposed in the coil springs 15 and 16 in surrounding relation to the coupling shafts 12, respectively, relative shearing displacements of the exhaust pipe 2 with respect to the exhaust pipe 4 can also be prevented. Also, damage to the bellows tube 8 based on the shearing displacements can be prevented.

In the joint 1 in this embodiment, exhaust gases from the exhaust pipe 2 to the exhaust pipe 4 flow while being guided by the inner pipe 52, the high-temperature exhaust gases do not directly contact the bellows tube 8. Accordingly, the early deterioration of the bellows tube 8 due to the high-temperature exhaust gases can be prevented, and the vibration of the bellows tube 8 itself due to the high-speed exhaust gas flow can also be prevented.

Water or stones which jump into the joint 1 through an annular gap 71 between the flanges 3 and 5 are hampered by the outer pipe 51. As a result, it is possible to prevent water from being directly splashed onto the bellows tube 8 or stones from colliding against it, so that the occurrence of cracks, holes, or the like in the bellows tube 8 due to thermal shocks or the like can be prevented.

Next, a description will be given of an example of assembling the joint 1. First, the flange 3 is prepared, and one end 53 of the outer pipe 51 is spot-welded onto the flange 3 to fix the outer pipe 51 to the flange 3. Then, the bellows tube 8 is inserted into the flange 3 and the outer pipe 51, and one end 6 of the bellows tube 8 is spot-welded to fix the bellows tube 8 to the flange 3. Further, the inner pipe 52 is inserted into the bellows tube 8, and one end 61 of the inner pipe 52 is spot-welded in the same way as described above, so as to fix the inner pipe 52 to the flange 3 via the bellows tube 8. Meanwhile, a subassembly which is comprised of the flange 5, the coupling shafts 12 attached to the flange 5 at the respective ends 9, and the coil springs 15 and the resilient hollow cylindrical members 17 that are fitted concentrically over the coupling shafts 12 is prepared. The coupling shafts 12 of this subassembly are respectively passed through the through holes 11 in the flange 3, and the coil springs 16 and the resilient hollow cylindrical members 18 are then mounted over portions of the coupling shafts 12 projecting from the through holes 11, respectively. The spring seats 14 are threadedly engaged on the other ends 13 of the coupling shafts 12 such that the coil springs 15 and 16 and the resilient hollow cylindrical members 17 and 18 are compressed to a desired degree. The joint 1 which is assembled as described above is installed between the exhaust pipes 2 and 4 by means of welding 22 and 32.

Figure 4:
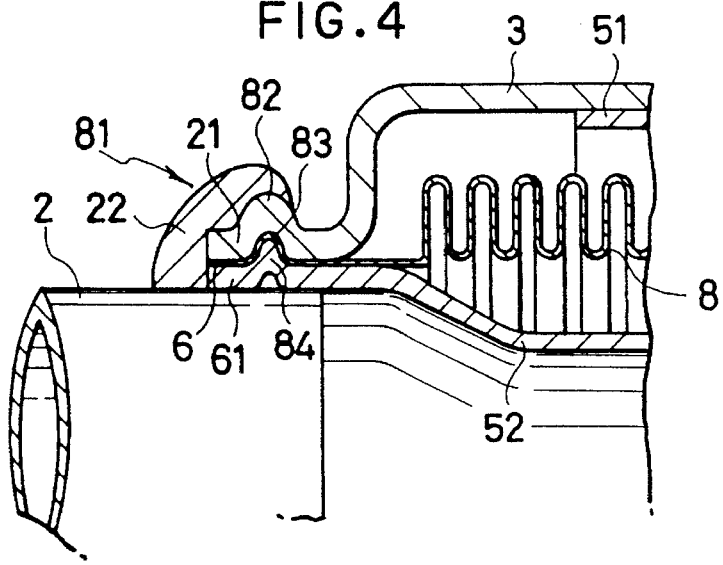
FIG. 4 is a partially cross-sectional view of a preferred example of a joining means in the joint in accordance with the present invention.
Figure 5:
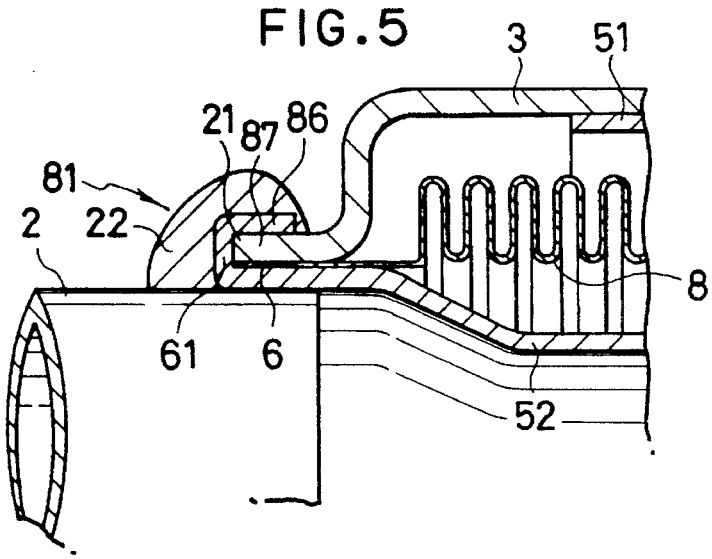
FIG. 5 is a partially cross-sectional view of another preferred example of the joining means.
Figure 6:
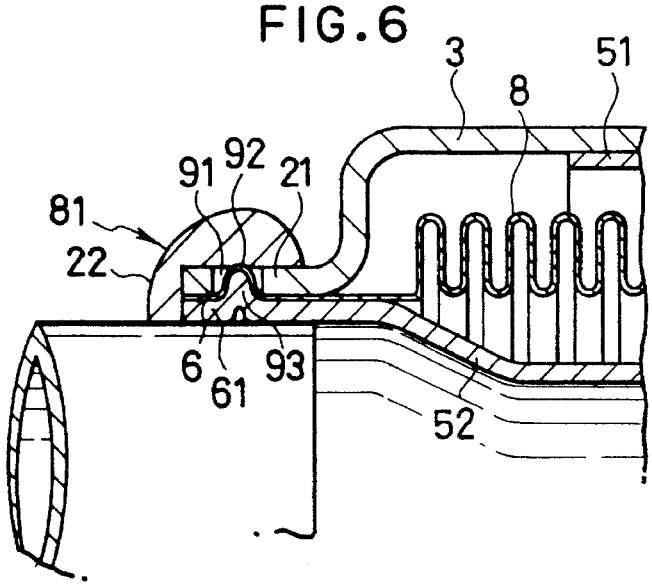
FIG. 6 is a partially cross-sectional view of still another preferred example of the joining means.
Figure 7:
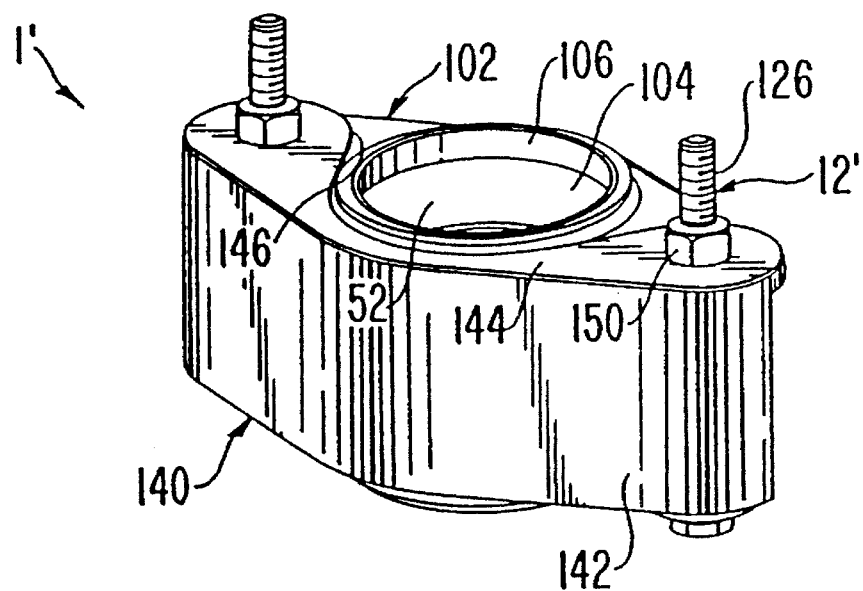
FIG. 7 is a front perspective view illustrating another embodiment of the present invention.
Figure 8:
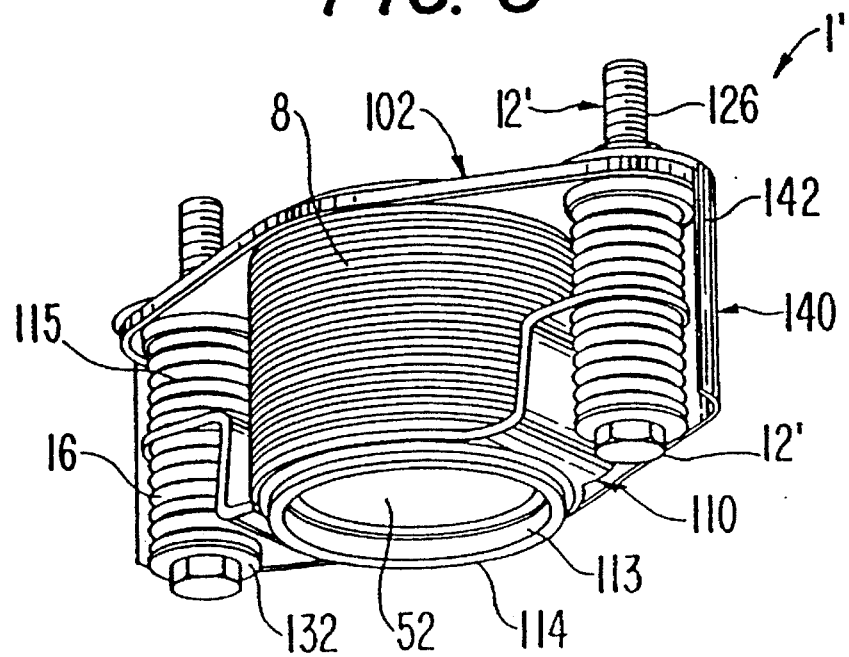
FIG. 8 is a rear perspective view of the embodiment of FIG. 7.
Figure 9:
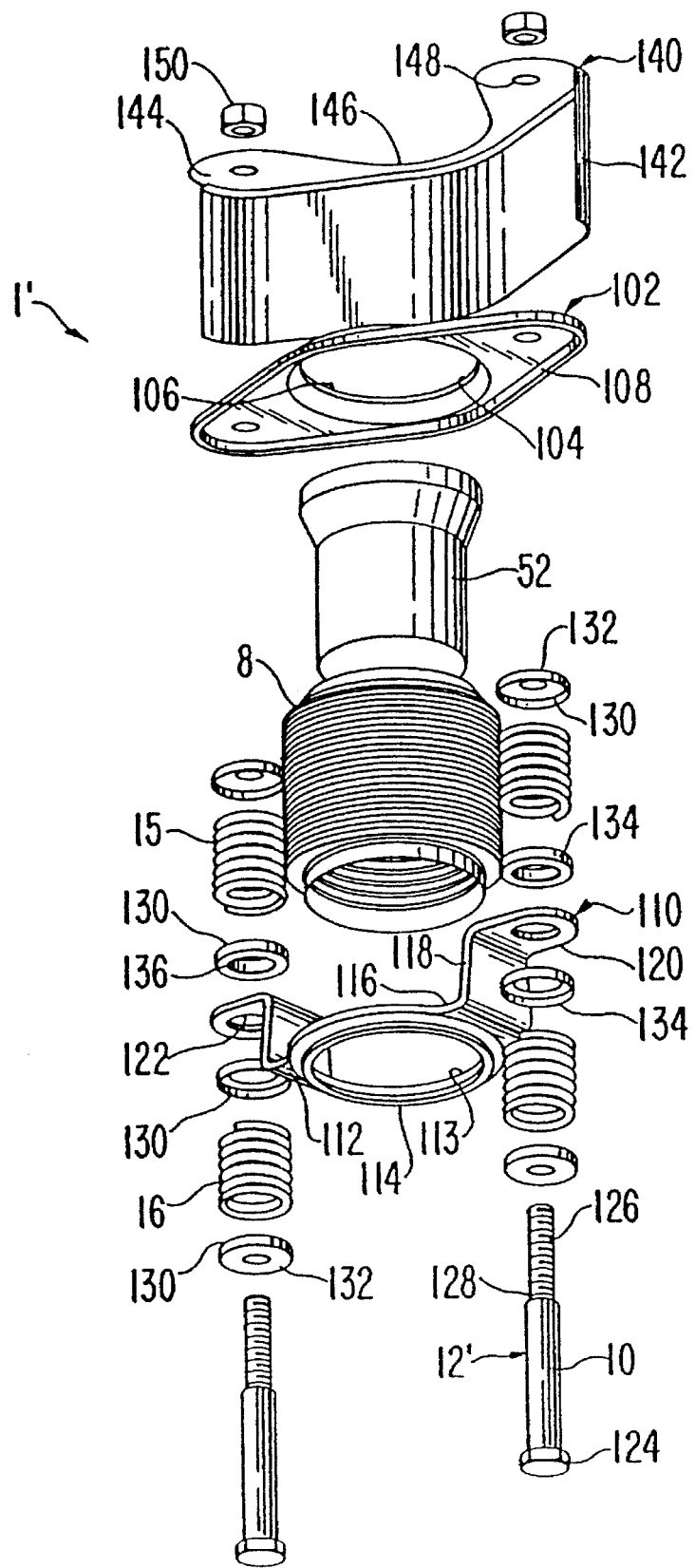
FIG. 9 is an exploded view of the embodiment of FIG. 7.
Figure 10:
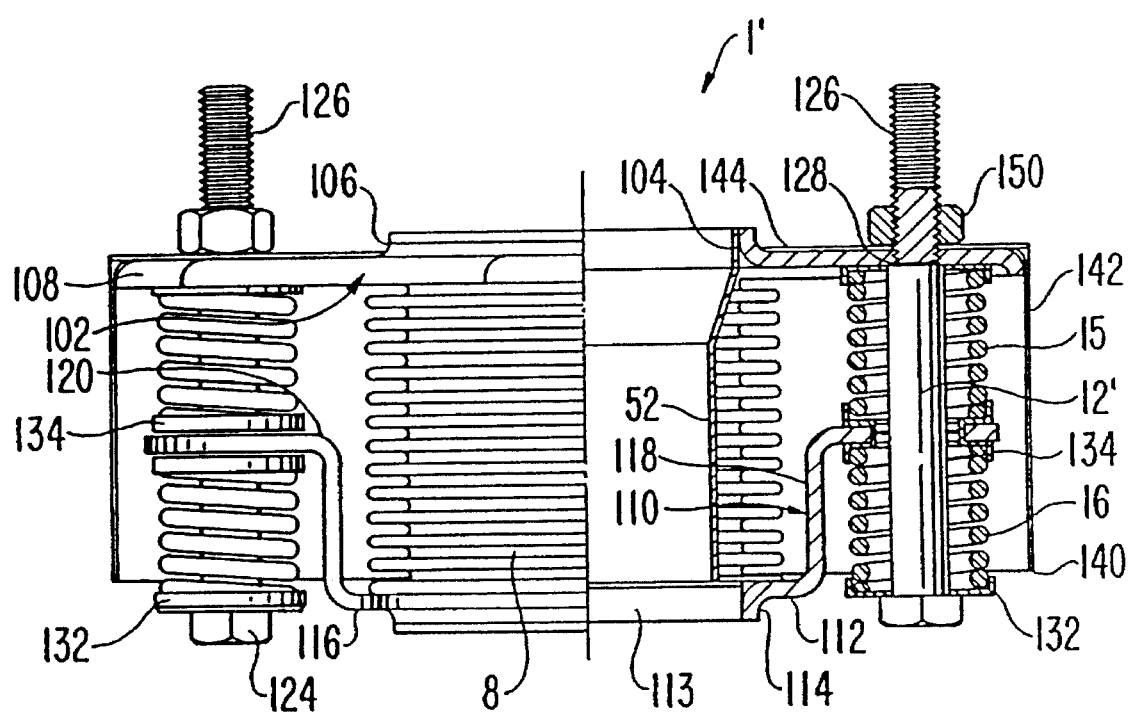
FIG. 10 is an elevatinal view, partly in section, of the embodiment of FIG. 7.

Although, in the above example, the bellows tube 8 and the inner pipe 52 are attached to the flange 3 by means of spot welding, the bellows tube 8 and the inner pipe 52 may alternatively be attached to flange 3 by means of a joining means 81 as shown in FIGS. 4 to 6.

Namely, the joining means 81, shown in FIG. 4, for joining together the respective one ends 21, 6, and 61 of the flange 3, the bellows tube 8, and the inner pipe 52 is composed of curved portions 82, 83, and 84 which are formed in a mutually complementary manner in the respective one ends 21, 6, and 61 of the flange 3, the bellows tube 8, and the inner pipe 52. Accordingly, by fitting together the curved portions 82, 83, and 84, the bellows tube 8 and the inner pipe 52 can be attached to the flange 3. As the welding 22 is subsequently provided, the respective one ends 21, 6, and 61 of the flange 3, the bellows tube 8, and the inner pipe 52 can be secured to the exhaust pipe 2.

The joining means 81 shown in FIG. 5 is composed of a folded-back portion 86 formed at one end 61 of the inner pipe 52. As the respective one ends 21 and 6 of the flange 3 and the bellows tube 8 are fitted in an annular cavity 87 defined by the folded-back portion 86, the bellows tube 8 and the inner pipe 52 can be attached to the flange 3.

The joining means 81 shown in FIG. 6 is composed of a plurality of through holes 91 formed at one end 21 of the flange 3, and a plurality of curved portions 92 and 93 formed in a mutually complementary manner in the respective one ends 6 and 61 of the bellows tube 8 and the inner pipe 52 so as to be inserted into the through holes 91, respectively. As the mutually fitted curved portions 92 and 93 are fitted into the through holes 91, the bellows tube 8 and the inner pipe 52 can be secured to the flange 3.

Although the joint 1 is provided with the outer pipe 51 for shielding water and stones, an arrangement may be alternatively or additionally provided such that the generally elliptical offset edge portions 28 and 38 of the flanges 3 and 5 are formed with different diameters and longer axial lengths. In this case, the flanges 3 and 5 are disposed such that portions of the generally elliptical offset edge portions 28 and 38 thus formed overlap with each other in the radial direction, thereby preventing the annular gap 71 from being formed.

FIGS. 7 through 12 of the drawing illustrate other embodiments of the invention in which, in the description thereof, like numerals are ascribed to like parts. In the embodiment of FIGS. 7 to 10 the flexible joint 1' employs a metal flange 102 that is fixed to the exhaust pipe 2 of the engine (not shown) and is a substantially flat plate member containing a central through-opening 104 having an upturned cylindrical portion 106 about its periphery for welded attachment of the inner pipe 52 and one end of the bellows tube 8. The flange 102 has a somewhat elliptical configuration with its outer peripheral edge containing a downturned rim 108. The portion of the flange 102 projecting radially outwardly from the opening 104 contains oppositely spaced, smaller diameter through-holes 36 for reception of the ends of the respective coupling shafts, here indicated as 12', and defining spring seat portions 27.

The other metal flange, identified as 110, has a body 112 containing a central through-opening 113 having an offset cylindrical portion or rim 114 to which the other end of the bellows tube 8 and the tail pipe 4 are weldedly connected. Unlike the corresponding flange 3 of the earlier embodiment, the flange 110 need not contain a hollow cylindrical portion but, instead, contains a pair of oppositely extending radial extensions 116 containing stepped offsets each consisting of a vertical leg portion 118 and horizontal foot portion 120.

Foot portions 120 each contain through-opening 122 adapted for longitudinal alignment with the respective holes 36 of the flange 102 in order to receive the coupling shafts 12'. As shown, the foot portions 120 define the spring seating potions of the flange 110 and are disposed at a position axially intermediate the ends of the bellows tube 8, preferably about midway between such ends.

In the illustrated embodiment, the coupling shafts 12' each comprise an axially elongated intermediate portion 10 having an integrally formed head 124 at one end and its other end being a threaded portion 126 that is separated from the portion 10 by an annular shoulder 128. The springs employed for biasing the flanges 102 and 110 are coil springs 15 and 16, although other forms of compression springs, such as Belvelle-type springs may be employed. As shown, springs 16 are disposed about the respective coupling shafts 12' and engaging seating surfaces on the foot portions 120 of the flange 110 to produce biasing forces in opposition to those produced by the springs 15.

The alternate embodiments of flexible joint described here are operative either with or without the hollow cylindrical damping sleeves 17 and 18 of the foregoing construction. In furtherance of the reduction of noise normally encountered in assemblies in which damping sleeves are omitted, the use of spring-locating washers is contemplated. While all of the washers possess offset annular rims 130 for accurate locating of the springs 15 and 16, they are shown to be of two principle types. Washers 132 which are disposed at the ends of the intermediate portions 10 of the respective coupling shafts 12', adjacent the heads 124 at one end and the flange 102 at the other end, each have a through-opening 132 for passage of the coupling shafts 12' whose diameters place the washers in close clearance relation with respect to the coupling shafts whereby lateral movement between the washers 132, and thus the springs retained thereby, and the shafts is prevented.

Washers 134, which are located in the openings 122 in the foot portions 120, are formed with annular rims 136 extending from the central holes oppositely from the rims 130 that extend from the outer peripheral edge of the washer. The rims 136 are of an external diameter to be snugly received in foot portion openings 122. Their internal diameter, on the other hand, is sufficiently greater than the diameter of the intermediate portions 10 of the coupling shafts 12' to provide adequate clearance, i.e., about 0.80 inches, to permit loose passage of the coupling shafts with respect to the foot portions 120 on opposite sides of flange 110 thereby to accommodate relative angular deflections between the respective flanges 102 and 110.

The annular rim 130 about the outer peripheral edge of the respective washers 134 corresponds in diameter to the corresponding rims on the washers 132 and serve to space the springs concentrically from the coupling shafts 12'. Thus, since, in each instance, relative transverse movement between the respective springs and the associated coupling shaft 12' is prevented, any noise-inducing contact between the springs and the shafts is concomitantly suppressed when deflections occur between the components of the joint.

Shown also in association with this embodiment of the invention is a protection shield 140 which may be utilized to protect the bellows tube 8 and other components of the joint against the harmful effects caused by the impacting of solid and liquid foreign elements on these members. The shield 140 comprises a formed wall 142 which is substantially longitudinally coextensive with the joint. The wall 142 of shield 140 need only extend part way about the periphery of the joint in order to cover that portion which is exposed to road debris and other foreign matter. The remainder of the joint, being in close proximity to the underside of the vehicle, is thus protected without need of jacketing by the shield.

As shown, attachment of the shield 140 to the joint is effected by an end wall 144 which is perpendicularly offset from the wall 142. End wall 144, which is formed with a recess 146 to accommodate the central opening 104 in flange 102, contains bolt openings 148 for reception of the threaded ends of the respective coupling shafts 12' whereby the shield can be connected by the nuts 150 that secure the assembly of the joint components.

Figure 11:
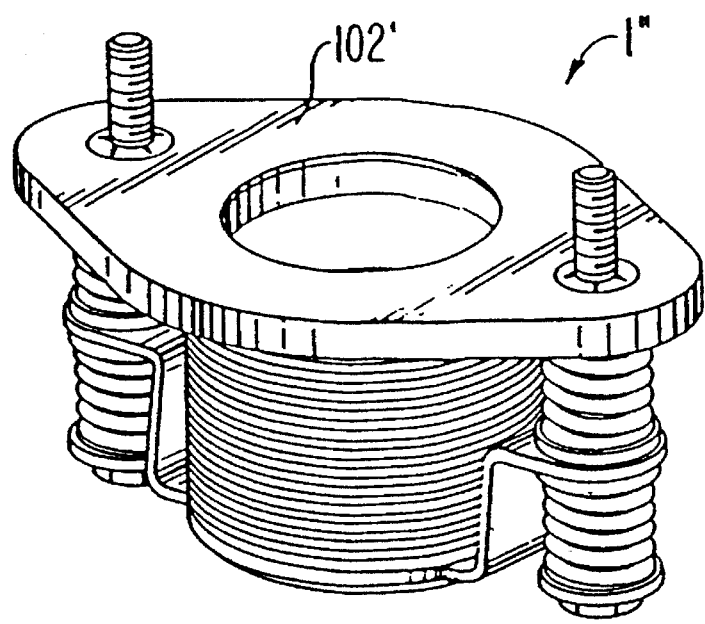
FIG. 11 is a perspective view illustrating yet another embodiment of the invention.
Figure 12:
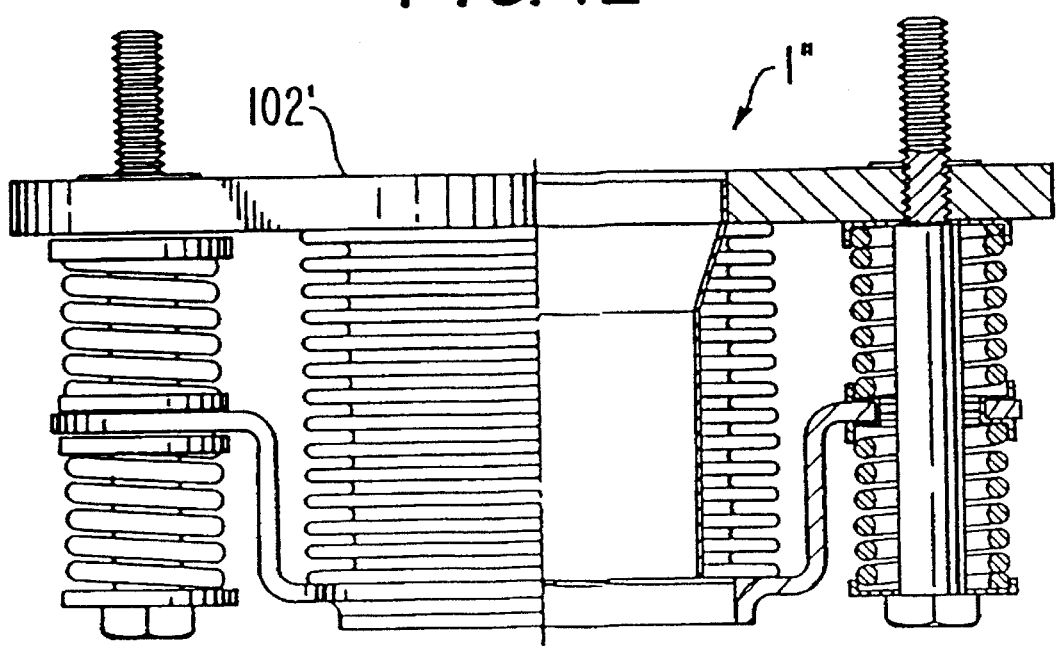
FIG. 12 is an elevational view, partly in section, of the embodiment of FIG. 11.

The joint embodiment illustrated in FIGS. 11 and 12 and identified by numeral 1" is substantially the same, both structurally and functionally, as that illustrated in FIGS. 7 to 10, except that the flange, indicated as 102', is a relatively heavy duty member adapted for attachment directly to an engine casing (not shown). Although not depicted in the drawing figures, it will be understood that either form of protection, i.e., the outer pipe 51 described in connection with the embodiment of FIGS. 1 to 6 or the shield 140 described in connection with the embodiment of FIG. 7 to 10, as well as the damping members 17 and 18 are equally adapted for use in this embodiment of the invention.

Figure 13:
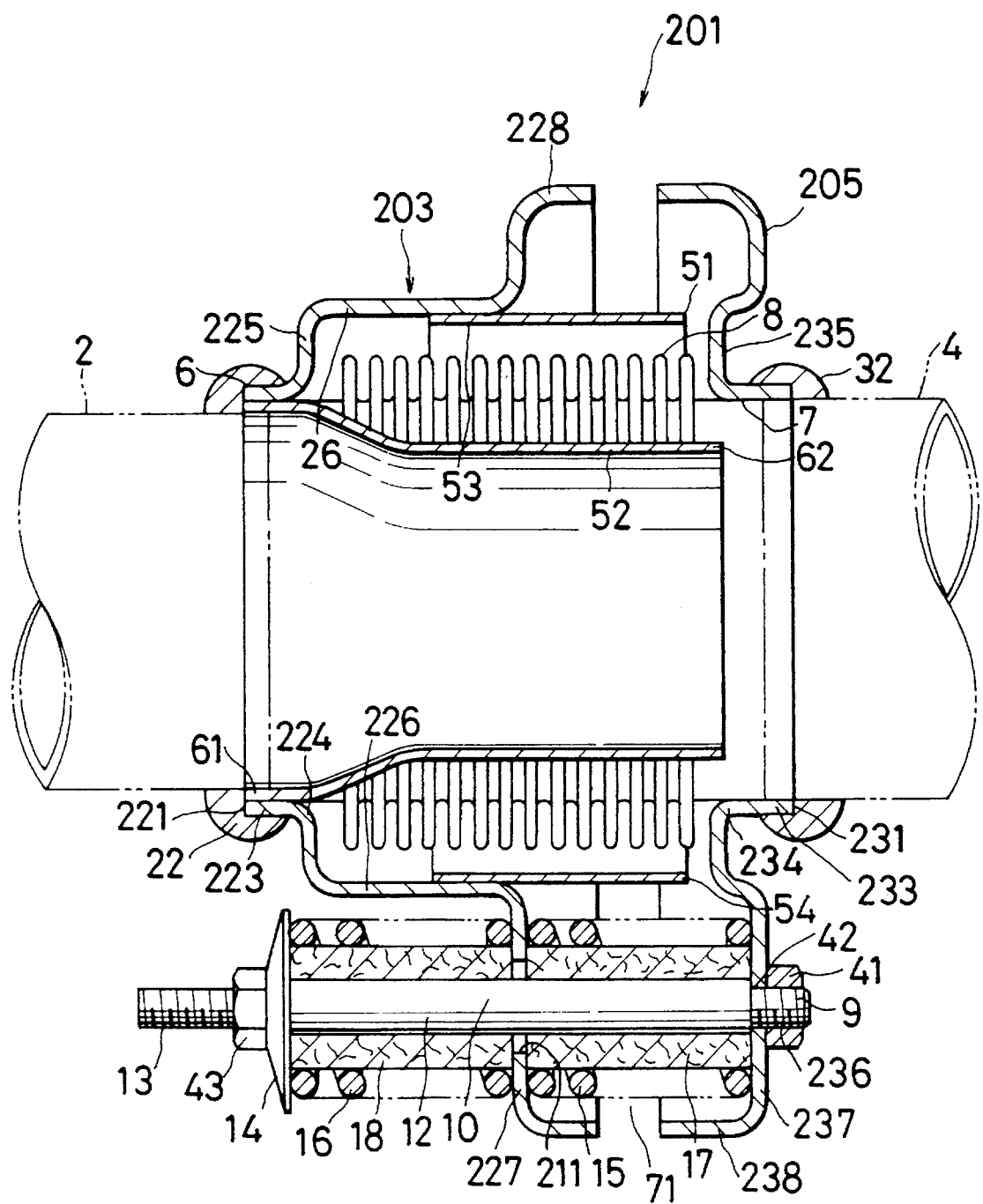
FIG. 13 is a cross-sectional view of a still another embodiment of the present invention.
Figure 14:
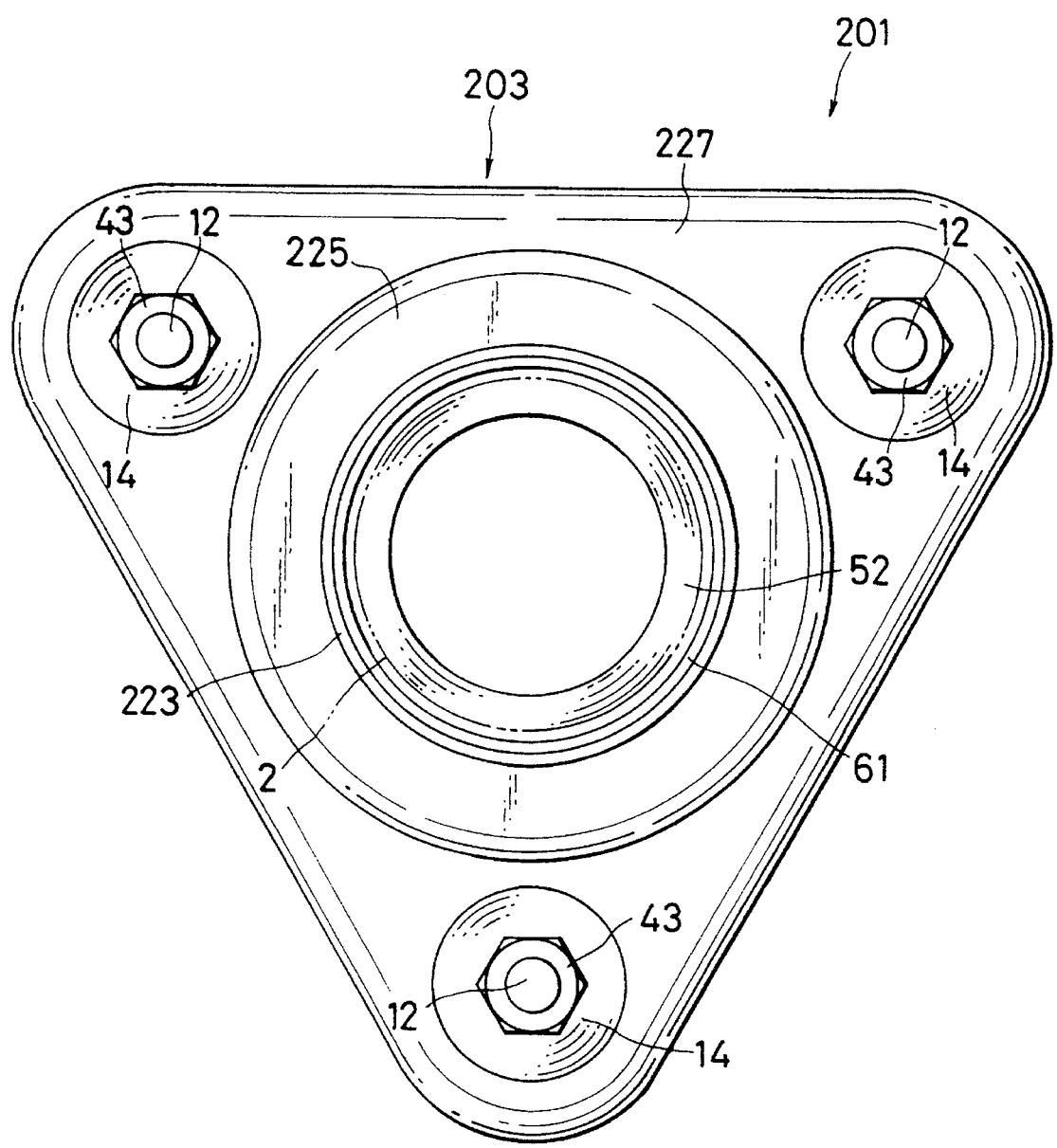
FIG. 14 is a left side elevational view of the embodiment shown in FIG. 13.

FIGS. 13 and 14 of the drawing illustrate still another embodiment of the present invention in which, in the description thereof, like numerals are ascribed to like parts. In the flexible joint 201 in this embodiment shown in FIGS. 13 and 14, a flange 203 of a generally equilateral triangular shape fixed to the exhaust pipe 2 of the engine-side exhaust system and a flange 205 of a generally equilateral triangular shpe fixed to the exhaust pipe 4 of the tail pipe-side exhaust system are disposed opposite to each other, each of three coupling shafts 12 is disposed in a vicinity of each apex of triangular flanges 203 and 205 and passes through the same, and the pair of coil springs 15 and 16, and the pair of resilient hollow cylindrical members 17 and 18 is disposed concentrically with each of the coupling shafts 12.

The metal flange 203 is comprised of a small-diameter hollow cylindrical portion 223 which is secured to the exhaust pipe 2 at an annular end 221 thereof by means of welding 22 or the like; an annular portion 225 extending radially outward from an annular other end 224 of the small diameter hollow cylindrical portion 223, a large-diameter hollow cylindrical portion 226 extending axially from a rim of the annular portion 225; a spring seat portion 227 of a generally equilateral triangular shape in which each of three through holes 211 is formed in a vicinity of each apex of the portion 227, and a generally equilateral triangular cylindrical offset edge portion 228 extending axially from a rim of the spring seat portion 227 toward the flange 205.

The metal flange 205 is comprised of a hollow cylindrical portion 233 which is secured to the exhaust pipe 4 at an annular end 231 thereof by means of welding 32 or the like; an annular portion 235 extending radially outward from another end 234 of the hollow cylindrical portion 233, a spring seat portion 237 of a generally equilateral triangular shape extending radially outward from a rim of the annular portion 235 and having three through holes 236, each of which is disposed in a vicinity of each apex of the portion 237; and a generally equilateral triangular offset edge portion 238 extending axially from a rim of the spring seat portion 237 toward the flange 203.

In the joint 201 described above, each combination of the pair of coil springs 15 and 16 and the pair of resilient hollow cylindrical members 17 and 18 is disposed at regular distance or regular angle of 120° in circumferential direction of the joint 201, compared with the joint 1, 1' and 1". Therefore, even if the exhaust pipe 2 and 4 are angularly displaced relatively to each other in various directions due to the operation of the engine, substantially same strong spring force occurs, so that the joint 201 has the advantage of preventing damage to the bellows tube 8 caused by excessive angular displacement in an particular direction. Since the exhaust pipe 2 and 4 are connected to each other by substantially same strong spring force in circumferential direction, the offset of the joint 201 from axial center can be prevented, and furthermore, the relative angular displacement(offset) between the exhaust pipe 2 and 4 due to its own weight can be prevented even after the joint 201 is installed in an automobile.

What is claimed is:

1. A flexible joint for an automobile exhaust pipe, comprising:

first flange means to be fixed to an exhaust pipe of an engine-side exhaust system;

second flange means to be fixed to an exhaust pipe of a tail pipe-side exhaust system;

flexible bellows tube means having one end to be fixed to said exhaust pipe of said engine-side exhaust system and another end to be fixed to said exhaust pipe of said tail pipe-side exhaust system so as to couple said two exhaust pipes to each other in such a manner that an angle of connection of said two exhaust pipes to each other is changeable by means of a bending of the flexible bellows tube means and said two exhaust pipes are capable of freely moving relatively toward or away from each other in an axial direction by means of an expansion and contraction of the flexible bellows tube means;

coupling shaft means having one end fixed to one of said first and second flange means and an intermediate portion passing loosely through a hole formed in the other one of said first and second flange means;

spring seat means attached to another end of said coupling shaft means;

first coil spring means disposed between said first and second flange means concentrically with said coupling shaft means;

second coil spring means disposed between the other one of said flange means and said spring seat means concentrically with said coupling shaft means;

first resilient hollow cylindrical member means disposed between said first and second flange means concentrically with said coupling shaft means and formed by compressing a wire mesh sheet; and second resilient hollow cylindrical member means disposed between the other one of said flange means and said spring seat means concentrically with said coupling shaft means and formed by compressing the wire mesh sheet, said the other one of said first and second flange means having first spring seat portion extending radially for seating said first and second coil spring means, said spring seat portion being disposed at a position corresponding to an axially intermediate position of said bellows tube means.

2. A flexible joint for an automobile exhaust pipe according to claim 1, wherein said hole is formed in said first flange means, said one end of said coupling shaft means is fixed to said second flange means, and said second coil spring means and said second resilient hollow cylindrical member means are disposed between said first flange means and said spring seat means.

3. A flexible joint for an automobile exhaust pipe according to claim 2, wherein said first flange means includes a hollow cylindrical portion having one end to be fixed to said exhaust pipe of said engine-side exhaust system, said spring seat portion being provided on and extending outward from another end of said hollow cylindrical portion.

4. A flexible joint for an automobile exhaust pipe according to claim 3, further comprising outer pipe means disposed outside and concentrically with said bellows tube means and having one end fixed to said hollow cylindrical portion of said first flange means and another end disposed in a vicinity of said another end of said bellows tube means to be fixed to said exhaust pipe of said tail pipe-side exhaust system.

5. A flexible joint for an automobile exhaust pipe according to claim 3 or 4, further comprising inner pipe means disposed inside and concentrically with said bellows tube means and having one end to be fixed to said exhaust pipe of said engine-side exhaust system and another end disposed in a vicinity of said another end of said bellows tube to be fixed to said exhaust pipe of said tail pipe-side exhaust system.

6. A flexible joint for an automobile exhaust pipe according to claim 1, wherein said first flange means includes a hollow cylindrical portion having one end to be fixed to said exhaust pipe of said engine-side exhaust system, said spring seat portion being provided on and extending outward from another end of said hollow cylindrical portion.

7. A flexible joint for an automobile exhaust pipe according to claim 6, further comprising outer pipe means disposed outside and concentrically with said bellows tube means and having one end fixed to said hollow cylindrical portion of said first flange means and another end disposed in a vicinity of said another end of said bellows tube means to be fixed to said exhaust pipe of said tail pipe-side exhaust system.

8. A flexible joint for an automobile exhaust pipe according to claim 6 or 7, further comprising inner pipe means disposed inside and concentrically with said bellows tube means and having one end to be fixed to said exhaust pipe of said engine-side exhaust system and another end disposed in a vicinity of said another end of said bellows tube means to be fixed to said exhaust pipe of said tail pipe-side exhaust system.

9. A flexible joint for an automobile exhaust pipe according to claim 1, wherein said first flange means includes a small-diameter hollow cylindrical portion to be secured at one end thereof to said exhaust pipe of said engine-side exhaust system, an annular portion extending radially outward from another end of said small-diameter hollow cylindrical portion, a large-diameter hollow cylindrical portion extending axially from a rim of said annular portion, and a generally elliptical hollow cylindrical portion, said spring seat portion being provided on and extending outward from said large-diameter hollow cylindrical portion, said generally elliptical hollow cylindrical portion extending axially from a rim of said spring seat portion toward said second flange, and wherein said second flange means includes a hollow cylindrical portion to be secured at one end thereof to said exhaust pipe of said tail pipe-side exhaust system, an annular portion extending radially outward from another end of said hollow cylindrical portion of said second flange means, a spring seat portion extending radially outward from a rim of said annular portion of said second flange means, and a generally elliptical hollow cylindrical portion extending axially from a rim of said spring seat portion of said second flange means toward said first flange means.

10. A flexible joint for an automobile exhaust pipe according to claim 9, wherein said hole is formed in said first flange means, said one end of said coupling shaft means is fixed to said second flange means; and said second coil spring means and said second resilient hollow cylindrical member means are disposed between said first flange means and said spring seat means.

11. A flexible joint for an automobile exhaust pipe according to claim 9 or 10, further comprising outer pipe means disposed outside and concentrically with said bellows tube means and having one end fixed to said large-diameter hollow cylindrical portion of said first flange means and another end disposed in a vicinity of said another end of said bellows tube means to be fixed to said exhaust pipe of said tail pipe-side exhaust system.

12. A flexible joint for an automobile exhaust pipe according to claim 11, further comprising inner pipe means disposed inside and concentrically with said bellows tube means and having one end to be fixed to said exhaust pipe of said engine-side exhaust system and another end disposed in a vicinity of said another end of said bellows tube means to be fixed to said exhaust pipe of said tail pipe-side exhaust system.

13. A flexible joint for an automobile exhaust pipe according to claim 9 or 10, further comprising inner pipe means disposed inside and concentrically with said bellows tube means and having one end to be fixed to said exhaust pipe of said engine side exhaust system and another end disposed in a vicinity of said another end of said bellows tube means to be fixed to said exhaust pipe of said tail pipe-side exhaust system.

14. A flexible joint for an automobile exhaust pipe according to claim 1, further comprising inner pipe means disposed inside and concentrically with said bellows tube means and having one end to be fixed to said exhaust pipe of said engine-side exhaust system and another end disposed in a vicinity of said another end of said bellows tube means to be fixed to said exhaust pipe of said tail pipe-side exhaust system, and joining means for joining together respective one ends of said first flange means, said bellows tube means, and said inner pipe means which are to be fixed to said exhaust pipe of said engine-side exhaust system.

15. A flexible joint for an automobile exhaust pipe according to claim 14, wherein said joining means includes curved portions formed in a mutually complementary manner in said respective one ends of said first flange means, said bellows tube means, and said inner pipe means.

16. A flexible joint for an automobile exhaust pipe according to claim 14, wherein said joining means includes a folded-back portion formed at said one end of said inner pipe means, and said respective one ends of said first flange means and said bellows tube means are fitted in an annular cavity defined by said folded-back portion.

17. A flexible joint for an automobile exhaust pipe according to claim 14, wherein said joining means includes a plurality of through holes formed at said one end of said first flange means, and a plurality of curved portions formed in a mutually complementary manner in said respective one ends of said bellows tube means and said inner pipe means.

18. A flexible joint for an automobile exhaust pipe according to any one of claims 14 to 17, wherein said hole is formed in said first flange means, said one end of said coupling shaft means is fixed to said second flange means, and said second coil spring means and said second resilient hollow cylindrical member means are disposed between said first flange means and said spring seat means.

19. A flexible joint for an automobile exhaust pipe according to claim 18, wherein said first flange means includes a hollow cylindrical portion having one end to be fixed to said exhaust pipe of said engine-side exhaust system, said spring seat portion being provided on and extending outward from another end of said hollow cylindrical portion.

20. A flexible joint for an automobile exhaust pipe according to claim 19, further comprising outer pipe means disposed outside and concentrically with said bellows tube means and having one end fixed to said hollow cylindrical portion of said first flange means and another end disposed in a vicinity of said another end of said bellows tube means to be fixed to said exhaust pipe of said tail pipe-side exhaust system.

21. A flexible joint for installation between an engine and a tail pipe in an automotive exhaust system to accommodate relative angular and axial deflections therein, said joint comprising:

an axially elongated flexible bellows tube having one end adapted for connection in gas flow relation to said engine and its other end adapted for connection in gas flow relation to said tail pipe to allow the tail pipe to deflect in angular and axial direction relative to the engine by means of a bending, and an expansion and contraction of the flexible bellows tube;

a first flange assembled on said one end of said bellows tube and adapted to be operatively connected with respect to said engine;

a second flange assembled on said other end of said bellows tube and adapted for operative connection with respect to said tail pipe;

coupling shaft means having one end substantially fixed to one of said first and second flanges and its remainder loosely received in a through-hole in the other of said flanges;

first compression spring means operatively disposed between said first and second flanges for biasing said flanges apart;

second compression spring means disposed externally of the other one of said first and second flanges for biasing said flanges together; and said the other one of said flanges at its end opposite that assembled on said bellows tube including a radially extending spring seat portion, said spring seat portion being disposed at a position axially intermediate the ends of said bellows tube.

22. A flexible joint according to claim 21 wherein said first compression spring means comprises a first compression spring surrounding said coupling shaft means between said first and second flanges, and said second compression spring means comprises a second compression spring surrounding said coupling shaft in opposition to said first compression spring and extending between said other of said flanges and the other end of said coupling shaft.

23. A flexible joint according to claim 22 wherein said compression springs are coil springs.

24. A flexible joint according to claim 22 including means for maintaining said compression spring means in concentrically spaced relation from said coupling shaft means.

25. A flexible joint according to claim 24 in which said spring means are operatively positioned by locating washers, each having a rim thereon for receiving an axial end of a spring, said locating washers including washers for disposition at opposite ends of said coupling shaft means and containing an opening for close clearance engagement therewith, and washers intermediately positioned along said coupling shaft means containing an enlarged opening for loosely receiving said remainder of said coupling shaft means.

26. A flexible joint according to claim 25 wherein said through-hole in said flange receiving said remainder of said coupling shaft means is an enlarged diameter opening, and including locating washers shouldered on one side for reception in said through-hole and shouldered on the other side for reception of a spring.

27. A flexible joint according to claim 23 including a damping sleeve cooperatively associated with each said coil springs about said coupling shaft 28. A flexible joint according to claim 27 in which each said damping sleeves comprises a body of compressed wire mesh.

29. A flexible joint according to claim 21 wherein said spring seat portion of said the other flange is disposed at a position substantially midway between the ends of said bellows tube.

30. A flexible joint according to claim 21 including means for shielding components of the joint against contact with foreign objects.

31. A flexible joint according to claim 30 in which said shielding means comprises outer pipe means concentrically spaced from, and surrounding, said bellows tube, said outer pipe means having one end fixed to said first flange means and its other end disposed adjacent said other end of said bellows tube.

32. A flexible joint according to claim 30 in which said shielding means is a protective shield jacketing at least one transverse side of said joint, and means for releasably securing said shield thereto.

33. A flexible joint according to claim 32 in which said releasable securing means comprises threaded connectors for attaching said sleeve via said coupling shaft means to said flange means.

34. A flexible joint according to claim 21 including an inner pipe concentrically spaced inwardly of, and being substantially coextensive with, said bellows tube, said inner pipe communicating at one end with said engine for the guided conduct of exhaust gas through said joint.

35. A flexible joint for installation between an engine and a tail pipe in an automotive exhaust system to accommodate relative angular and axial deflections therein, said joint comprising:
- an axially elongated flexible bellows tube connected between said engine and said tail pipe for the conduct of exhaust gas therebetween and to allow the tail pipe to deflect in angular and axial direction relative to the engine by means of a bending, and an expansion and contraction of the flexible bellows tube;
- a pair of axially spaced first and second flanges assembled to the respective ends of said bellows tube, said flanges extending radially of said bellows tube and having openings on transversely opposite sides;
- a coupling shaft extending through corresponding openings in said first and second flanges for coupling said flanges, each said coupling shaft being substantially fixed at one end with respect to one of said flanges and having its portion remote from said one end extending loosely through the other of said flanges;
- a plurality of compression springs surrounding each of said coupling shafts and including a first compression spring disposed between said first and second flanges for biasing said flanges apart and a second compression spring disposed between the free end of said coupling shaft and the adjacent flange tending to bias said flanges together; and
- said other flange having a spring seat surface disposed at a position axially intermediate the end of said bellows tube.

36. A flexible joint according to claim 35 including a set of locating washers each being operative for receiving an end of a compression spring for concentrically spacing said compression springs from the respective coupling shafts, said locating washers including washers adjacent the fixed and free ends of said coupling shafts having limited clearance openings and washers mounted in said other flange having an internal diameter providing an enlarged clearance opening permitting loose passage of said coupling shafts.

37. A flexible joint according to claim 35 in which said compression springs are coil springs.

38. A flexible joint according to claim 35 in which said spring seating surface of said other flange is disposed substantially midway between the ends of said bellows tube.

39. A flexible joint according to claim 37 in which said other flange includes a hollow cylindrical portion concentrically spaced from said bellows, and a cylindrically formed outer pipe concentrically spaced from said bellows having one end attached to said other flange, said outer pipe cooperating with said hollow cylindrical portion of said flange for shielding said joint against contact by foreign objects.

40. A flexible joint according to claim 37 including a protective shield jacketing at least one transverse side of said joint for shielding said joint against contact by foreign objects, and means on said other flange for securing said protective shield thereto.

41. A flexible joint according to claim 35 including an inner pipe concentrically spaced inwardly of and being substantially coextensive with said bellows tube, said inner pipe communicating at one end with said engine for the guided conduct of exhaust gas through said joint.

42. A flexible joint according to claim 37 including damping sleeves cooperatively associated with said coil springs about said coupling shaft means.

43. A flexible joint according to claim 42 in which said damping sleeves each comprise a body of compressed wire mesh.

44. A flexible joint according to claim 43 in which said damping sleeves are each disposed concentrically intermediate said coupling shaft means and said coil spring.

45. A flexible joint for an automobile exhaust pipe according to claim 1, wherein said first flange means is provided with said first spring seat portion of a generally equilateral triangular shape, and wherein said second flange means includes a second spring seat portion of a generally equilateral triangular shape, said coupling shaft means being disposed in a vicinity of each apex of said first and second spring seat portions of the generally equilateral triangular shape and passing through the same.

46. A flexible joint for an automobile exhaust pipe according to claim 45, wherein said hole is formed in said first spring seat portion, said one end of said coupling shaft means is fixed to said second spring seat portion, and said second spring means and second cylindrical member means are disposed between said first spring seat portion and said spring seat means.

47. A flexible joint for an automobile exhaust pipe according to claim 45 or 46, further comprising outer pipe means disposed outside and concentrically with said bellows tube means and having one end fixed to said flange means and another end disposed in a vicinity of said another end of said bellows tube means to be fixed to said exhaust pipe of said tail pipe-side exhaust system.

48. A flexible joint for an automobile exhaust pipe according to any one of claim 45 or 46, further comprising inner pipe means disposed inside and concentrically with said bellows tube means and having one end to be fixed to said exhaust pipe of engine-side exhaust system and another end disposed in a vicinity of said another end of said bellows tube means to be fixed to said exhaust pipe of said tail pipe-side exhaust system.

* * * * *

UNITED STATES PATENT AND TRADEMARK OFFICE
CERTIFICATE OF CORRECTION

PATENT NO. : 5,511,828
DATED : April 30, 1996
INVENTOR(S) : Kenneth M. Kurek, Alain Pierre, Takashi Maeda and Takashi Furukido It is certified that error appears in the above-indentified patent and that said Letters Patent is hereby corrected as shown below:

Column 13, line 2, delete ";" and insert --,--.

Column 15, line 9, after "shaft" insert --means--.

Signed and Sealed this

Ninth Day of July, 1996

*Attest:*

BRUCE LEHMAN

*Attesting Officer*     *Commissioner of Patents and Trademarks*